UNITED STATES PATENT OFFICE.

PAUL ALSLEBEN, OF BERLIN, GERMANY, ASSIGNOR TO JOHANN ABRAHAM VON WÜFFING, OF BERLIN, GERMANY.

MANUFACTURE OF FORMALDEHYDE COMPOUNDS AND PRODUCTS.

1,018,736.  Specification of Letters Patent.  Patented Feb. 27, 1912.

No Drawing.  Application filed January 27, 1911. Serial No. 604,997.

*To all whom it may concern:*

Be it known that I, PAUL ALSLEBEN, a citizen of the Empire of Germany, residing at Berlin, in the Empire of Germany, have invented certain new and useful Improvements in the Manufacture of Formaldehyde Compounds and Products, of which the following is a specification.

My invention relates to a variation of the process for the production of a formaldehyde compound described in the U. S. Patent No. 849,815. In the said patent a process for the formation of a formaldehyde compound from formaldehyde and milk sugar is described.

My invention consists in replacing the milk sugar by other sugars such as cane sugar, glucose, galactose, or fructose.

I will now proceed to describe my invention.

The advantages of the sugar compounds of formaldehyde are set forth at length in the above mentioned patent, but only one the combination, namely that of one molecule of milk sugar with five molecules of formaldehyde, is therein described. Now I have discovered that other bioses give exactly determinable compounds with formaldehyde of the like general composition. This is especially the case with cane sugar, the crystalline compound of which free from water contains 30.5% formaldehyde exactly corresponding to the theoretical composition.

The compound can be obtained by the same method as that given in the U. S. Patent No. 849,815, it can be pulverized and is permanent in dry air. Of the monoses, glucose is that most easily obtainable in commerce. As, however, glucose itself crystallizes with difficulty and shows an inclination to remain in the syrupy condition, it is not surprising that the formaldehyde compound can only be obtained in dry pulverizable condition with extraordinary difficulty and moreover has a great inclination to pass over again into a syrup. The tough syrup contains for two molecules glucose, five molecules of formaldehyde (the amount calculated is 29.4 and that found in practice averages 29.4). It is not very easy to recognize exactly the end point of the reaction. If the last traces of water are not removed, then there is easily obtained a product richer in formaldehyde while if the drying be too severe, slight losses of formaldehyde occur.

What has been said in regard to glucose applies also in the case of galactose, with which in the final product a formaldehyde content of about 30% was obtained. On the other hand, fructose appears to possess only a slighter combination power for formaldehyde.

With the monoses especially glucose, the removal of the last traces of water and the obtaining of a pulverizable product can easily be rendered possible by mixing the concentrated solution in which the glucose-formaldehyde compound has already been formed with an excess of a sugar, preferably milk sugar, and drying it in air at about 70° centigrade.

The above mentioned formaldehyde-sugar compounds are easily soluble in water and with greater difficulty in alcohol, but are insoluble in ether. On dissolving in alcohol the compounds separate after some time into their component parts, on which reaction the galactose-formaldehyde compound separates out the galactose almost quantitatively again.

The following examples are given of the process:

1. 15 kilos of 40% aqueous formaldehyde solution are heated to 50° centigrade, and then 10 kilos of cane sugar are added and as soon as it has been dissolved the mixture is evaporated *in vacuo* at about 65° centigrade. As soon as a concentration of 35° Baumé has been attained, the further drying in the air can be carried out at from 65° to 70° centigrade. But it is also possible to effect a concentration *in vacuo* to a higher density, over 42° Baumé, so that the syrup only just remains able to be poured out. It is then convertible by heating in air to about 70° quickly into an absolutely dry product which can be pulverized in the cold but which is very hygroscopic.

2. 1.5 kilos of 40% formaldehyde solution are heated to 50° centigrade, then 1 kilo of glucose is mixed in and the solution is evaporated *in vacuo* to from 65° to 70° centigrade to a density of about 40° Baumé. The syrup is then mingled in the kneading machine with three times the bulk of milk sugar and the product obtained is brought fully to dryness in air at 70° centigrade. The product thus obtained can be used for the production of tabloids, powders, etc.

3. 150 grams of 40% formaldehyde solution are heated to 50° centigrade and then mixed with 100 grams of crystallized galactose or fructose and evaporated *in vacuo* after the solution has taken place. There results an extremely tough transparent mass which cannot be pulverized, and in the case of galactose contains about 30%, and in the case of fructose about 22% of formaldehyde.

If it be desired to obtain exactly measured preparations, then before the syrup becomes too tough there should be mixed in about a three-fold bulk of milk sugar and then the last traces of water evaporated, by which means pulverizable products are obtained.

I claim:

1. The process of producing a formaldehyde sugar compound, comprising heating 3 parts by weight of 40% aqueous formaldehyde solution to a temperature of about 50° C., adding 2 parts by weight of glucose, allowing the glucose to dissolve, and evaporating the mixture *in vacuo* at a temperature of about 65° C. until a suitable degree of concentration has been obtained.

2. The process of producing products containing a formaldehyde sugar compound, consisting in heating 3 parts by weight of 40% aqueous formaldehyde solution to a temperature of about 50° C., adding 2 parts by weight of glucose, allowing the glucose to dissolve, evaporating the mixture *in vacuo* at a temperature of about 65-70° C. to a density of about 40° Baumé, mixing the resulting syrup with about three times its bulk of milk-sugar, and drying the product in the air at a temperature of about 70° C.

3. A new article of commerce, comprising a formaldehyde sugar compound easily soluble in water and soluble with greater difficulty in alcohol, but insoluble in ether, containing 30% of glucose in chemical combination with 70% of formaldehyde, mixed with several times its bulk of free milk-sugar.

PAUL ALSLEBEN.

Witnesses:
EMIL GÖLDNER,
EMIL SCHMITZ.